(No Model.)
J. PISSINGER.
WATER GAGE GLASS.
No. 572,181.　　　　　　　　　Patented Dec. 1, 1896.
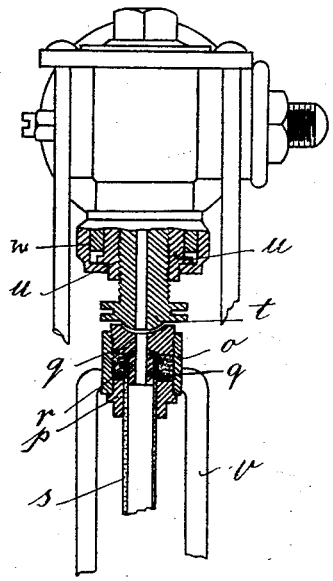
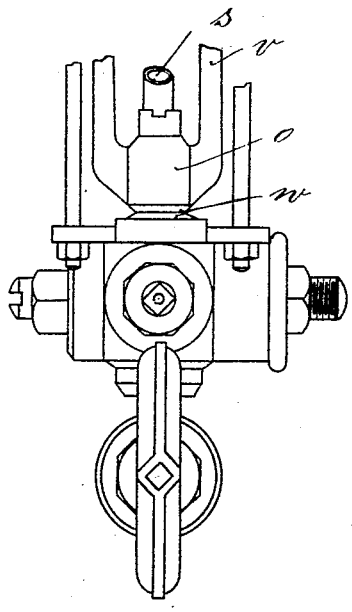
Witnesses
H. van Oldenneel
Otto Minck
Inventor
Josef Pissinger
by Richard
Attorneys

United States Patent Office.

JOSEF PISSINGER, OF MUNICH, GERMANY.

WATER-GAGE GLASS.

SPECIFICATION forming part of Letters Patent No. 572,181, dated December 1, 1896.

Application filed January 11, 1896. Renewed October 14, 1896. Serial No. 608,892. (No model.) Patented in Germany June 16, 1894, No. 80,226.

*To all whom it may concern:*

Be it known that I, JOSEF PISSINGER, a subject of the Emperor of Germany, and a resident of Munich, Bavaria, Germany, have invented certain new and useful Improvements in Water-Gage Glasses, (patented in Germany June 16, 1894, No. 80,226,) of which the following is a specification.

This invention relates to a water-gage glass; and its object is to provide a secure connection for the glass between the gage-cocks.

In the accompanying drawing is shown a gage-glass with its center broken away, the upper ends of the parts being in section.

The glass is shown at *s* and is centrally arranged, being protected by a cage composed of a series of bars *v*, joined at their upper and lower ends to rings *o*. A box *p* closes the lower end of the ring *o*, (see upper part of the figure,) and this box has a central opening receiving the end of the glass *s*. A packing-screw *q* closes the upper end of the ring, and between the box *p* and screw *q* is inserted the packing *r*, thus making a tight connection. The screw or plug *q* has a projecting nipple fitting within the end of the glass *s*, thus keeping the passage clear. The upper face of the plug *q* is formed concave to receive the convex face of the part *t*, which is screwed into the stuffing-box ring *u*, supported in the head *w*. The concavo-convex connection prevents leakage even when the parts are not exactly in alinement. The parts are readily detachable to remove the glass when broken and insert a new one.

I claim—

In combination, the nipples *t* having rounded bearing ends, the glass tubes and the carrier-frame therefor comprising the parts *q* having rounded bearings adapted to the nipples *t*, the boxes *p*, the rings *o* to which the boxes and parts *q* are attached and the protecting-rods V extending alongside the glass tube and connected to the rings *o*, substantially as described.

In testimony that I claim the foregoing as my invention I have signed my name in presence of two subscribing witnesses.

JOSEF PISSINGER.

Witnesses:
ALBERT WEICKMANN,
KARL MAYER.